US009634926B2

(12) United States Patent
Hatori et al.

(10) Patent No.: US 9,634,926 B2
(45) Date of Patent: Apr. 25, 2017

(54) METHOD FOR USE BY AN INFORMATION PROCESSOR

(71) Applicant: LENOVO (SINGAPORE) PTE. LTD., Singapore (SG)

(72) Inventors: Masahiko Hatori, Kanagawa-Ken (JP); Yasuharu Katsuno, Kanagawa-Ken (JP); Vijay Alone, Pune (IN); Toru Aihara, Kanagawa-Ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 65 days.

(21) Appl. No.: 14/669,750

(22) Filed: Mar. 26, 2015

(65) Prior Publication Data

US 2015/0200841 A1 Jul. 16, 2015

Related U.S. Application Data

(62) Division of application No. 11/377,541, filed on Mar. 16, 2006, now abandoned.

(51) Int. Cl.
*H04L 12/751* (2013.01)
*H04L 12/721* (2013.01)
(Continued)

(52) U.S. Cl.
CPC .......... *H04L 45/26* (2013.01); *H04L 12/4625* (2013.01); *H04W 76/021* (2013.01); *H04W 76/027* (2013.01)

(58) Field of Classification Search
CPC .. H04L 12/4625; H04L 45/26; H04W 76/021; H04W 76/027
See application file for complete search history.

(56) References Cited

U.S. PATENT DOCUMENTS

| 2003/0193481 | A1 | 10/2003 | Sokolsky | |
|---|---|---|---|---|
| 2005/0041596 | A1* | 2/2005 | Yokomitsu | H04L 29/12283 370/252 |
| 2005/0117526 | A1* | 6/2005 | Melnik | H04L 45/00 370/254 |

FOREIGN PATENT DOCUMENTS

| EP | 1667379 | 6/2006 |
|---|---|---|
| JP | 2000013823 | 1/2000 |

(Continued)

OTHER PUBLICATIONS

Shinichi Baba, Subir Das, Anthony McAuley, Yasuro ShobatakeTELCORDIA—Telcordia Technologies, Inc: "Dynamic Registration and Configuration Protocol (DRCP); draft-itsumo-drcp-00.txt"IETF Standard-Working-Draft, Internet Engineering Task Force, IETF, CH, Oct. 1, 1999 (Oct. 1, 1999), XP015030338ISSN: 0000-0004.

(Continued)

*Primary Examiner* — Omar Ghowrwal
(74) *Attorney, Agent, or Firm* — Russell Ng PLLC; Anthony P. Ng (57) ABSTRACT

A method and apparatus for connecting an information processor to any network to perform communications are disclosed. A setting information indicating network settings to be set for an information processor when performing communications via a network is stored. A route setting packet, which is sent by a network device connected to the network to which the information processor is connected, is acquired to set a route to be used by the network device to communicate with another device. A device identification information for identifying a network device from which the route setting packet was sent is extracted from the route setting packet. The information processor is allowed to perform communications by acquiring the setting information associated with the extracted device identification infor- (Continued)

mation, and the information is specifically set for the information processor.

2 Claims, 7 Drawing Sheets

(51) Int. Cl.
   *H04L 12/46* (2006.01)
   *H04W 76/02* (2009.01)

(56) References Cited

FOREIGN PATENT DOCUMENTS

| JP | 2002135289 | 5/2002 |
| JP | 2002261857 | 9/2002 |
| JP | 2002290445 | 10/2002 |
| JP | 2003091467 | 3/2003 |
| JP | 2003091467 A | 3/2003 |

OTHER PUBLICATIONS

Anthony McAnley Subir Das Telecordia Technologies Shinichi Baba Yasuro Shobatake Toshiba America Research Inc: "Dynamic Registration and configuration Pro tocol (DRCP), draft-itsumo-drop-00.txt" IETF Standard= working-draft, Internet Engineering Taskforce, IETF, CH, XP015030338 ISSN: 0000-0004 Section2 "Protocol Summary" particularly sub-sections 2.3 and 2.3.1, pp. 8-16, Oct. 1, 1999.

Cisco, "Hot Standby Router Protocol Features and Functionality", Document ID: 9234, Updated: May 25, 2006 www.cisco.com/c/en/us/.../hot-standby-router-protocol-hsrp/9234-hsrpguidetoc.html.

* cited by examiner

| LOCATION | ADAPTER | SETTING INFORMATION | MAC ADDRESS | MAC ADDRESS | ...... |
|---|---|---|---|---|---|
| OFFICE | WIRED NETWORK ADAPTER | SETTING FOR WIRED NETWORK 1 | XX-XX-XX-XX-XX-XX | XX-XX-XX-XX-XX-X1 | |
| HOME | WIRED NETWORK ADAPTER | SETTING FOR WIRED NETWORK 2 | YY-YY-YY-YY-YY-YY | YY-YY-YY-YY-YY-Y1 | |
| HOTEL | WIRELESS NETWORK ADAPTER | SETTING FOR WIRELESS NETWORK 1 | ZZ-ZZ-ZZ-ZZ-ZZ-ZZ | ZZ-ZZ-ZZ-ZZ-ZZ-Z1 | ............ |
| NEW1 | WIRED NETWORK ADAPTER | SETTING FOR WIRED NETWORK 3 | NOT SET | NOT SET | |
| ...... | ...... | ...... | ...... | ...... | |
| ON Road | WIRELESS NETWORK ADAPTER | SETTING FOR WIRELESS NETWORK 2 | WW-WW-WW-WW-WW-WW | WW-WW-WW-WW-WW-W1 | |

Fig. 6

METHOD FOR USE BY AN INFORMATION PROCESSOR

PRIORITY CLAIM

The present application is a divisional of U.S. patent application Ser. No. 11/377,541, filed Mar. 16, 2006, the contents of which is incorporated herein by reference.

CROSS REFERENCE TO RELATED APPLICATIONS

The present application claims benefit of priority under 35 U.S.C. §120 and 365 to the previously filed international patent application number PCT/JP2004/013457 entitled, "Automatic Switching of Network-related Settings," filed on Sep. 15, 2004 with a priority date of Sep. 18, 2003 based upon Japanese Patent Application No. 2003-326469, both of which are incorporated by reference herein.

BACKGROUND OF THE INVENTION

1. Technical Field

The present invention relates to network communications in general, and in particular to a method and apparatus for connecting an information processor to any network to perform communications.

2. Description of Related Art

With the proliferation of wireless network technology, wireless network access points can be found in offices and homes as well as on streets and in restaurants. As such, a user is able to perform communications at many places as long as the user is carrying a mobile communication terminal. It is known that network-related settings can be changed based on a Service Set ID (SSID) specified for the access point to communicate with.

Figure 1:
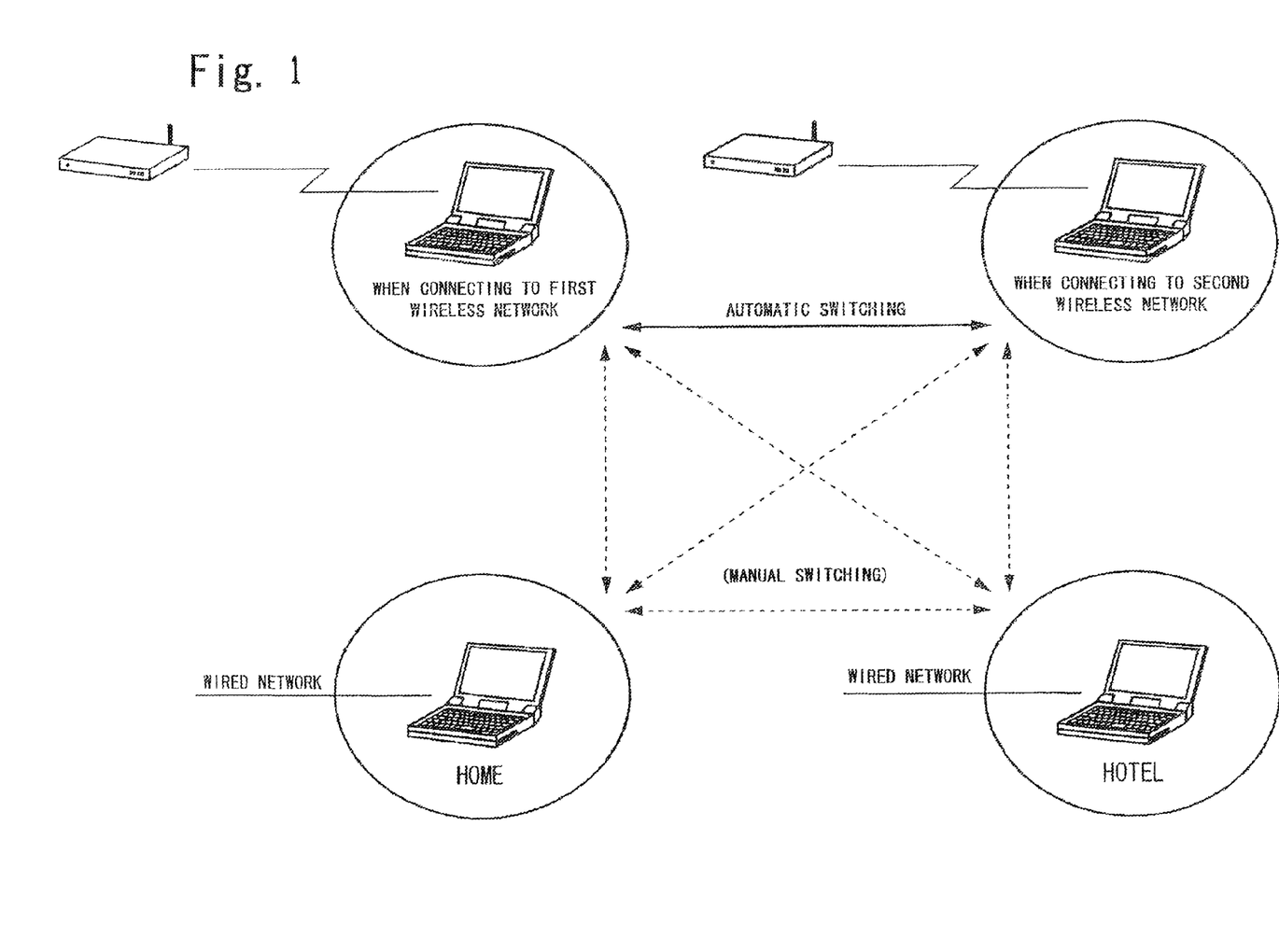
FIG. 1 is a diagram illustrating an example of switching among networks.

Referring now to the drawings and in particular to FIG. 1, there is depicted a diagram for illustrating an example of switching among networks. The access point with which an information processor communicates can be different between the time when it is connected to a first wireless network and the time when it is connected to a second wireless network. In addition, the SSID can also be different.

When the communication destination is changed from a wireless network to a wired network or vice versa, or when the communication destination is changed between wired networks, it is required to manually make network settings for the information processor, as shown in FIG. 1, and such procedure is very inconvenient. Furthermore, in a wireless network, the same SSID may be used by multiple access points. Therefore, when a system is using an SSID, it may not be appropriately detected that the connection has been changed.

Consequently, it would be desirable to provide to provide an improved method and apparatus for connecting an information processor to any network to perform communications.

SUMMARY OF THE INVENTION

In accordance with a preferred embodiment of the present invention, a setting information indicating network settings to be set for an information processor when performing communications via a network is stored. A route setting packet, which is sent by a network device connected to the network to which the information processor is connected, is acquired to set a route to be used by the network device to communicate with another device. A device identification information for identifying a network device from which the route setting packet was sent is extracted from the route setting packet. The information processor is allowed to perform communications by acquiring the setting information associated with the extracted device identification information, and the information is specifically set for the information processor.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 2:
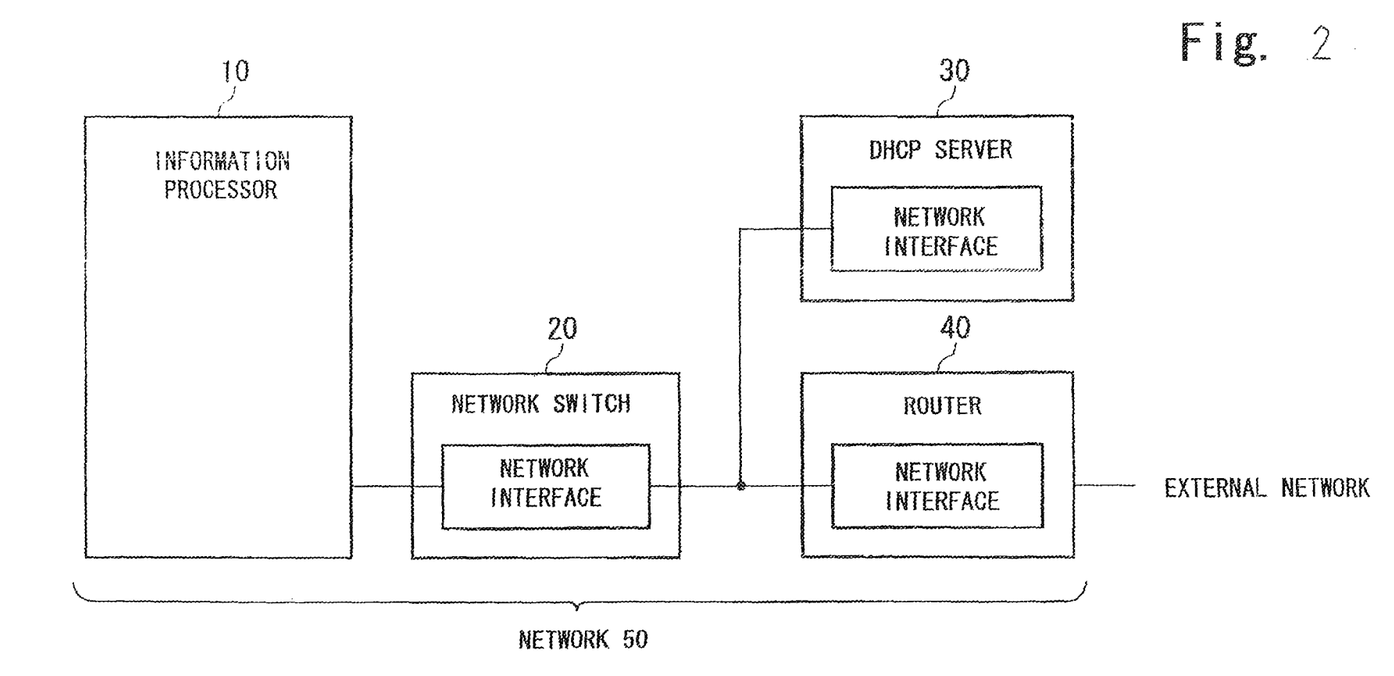
FIG. 2 is a block diagram of a network to which an information processor is connected.

With reference now to FIG. 2, there is depicted a block diagram of a network to which an information processor is connected, in accordance with a preferred embodiment of the present invention. As shown, a network 50 includes an information processor 10 connected to network devices such as a network switch 20, a DHCP server 30 and a router 40. Information processor 10 can be a mobile communication device such as a notebook computer or a personal digital assistant (PDA). Information processor 10 is designed to detect network 50 to which it is connected by acquiring device identification information about the various network devices on network 50, and perform network settings suitable for the connected network.

Network switch 20 controls communication routes among network devices via MAC addresses and device identification information specific to the network devices. DHCP server 30, which is an example of an assignment server according to the present invention, assigns to a device newly connected to network 50 an IP address for identifying the device within network 50. For example, if information processor 10 is newly connected to network 50, DHCP server 30 sets information processor 10 to a communicable condition by assigning an IP address to information processor 10. The assignment server according to the present invention is not limited to a DHCP server, and it may be a DHCP relay server for relaying communication between the DHCP server and information processor 10. Router 40 relays communications between network 50 and an external network.

Information processor 10 can communicate with any of network switch 20, DHCP server 30 and router 40. If information processor 10 can acquire the MAC address of any one of network switch 20, DHCP server 30 and router 40, it can identify connected network 50 based on the acquired MAC address. However, some networks may not be have at least one of network switch 20, DHCP server 30 and router 40. For example, network switch 20 may not be found in a relatively small-sized network. Even in such a case, information processor 10 attempts to acquire the MAC address of each of network switch 20, DHCP server 30 and router 40 in order to appropriately identify a connected network, and identifies the connected network based on any MAC address that can be acquired.

Figure 3:
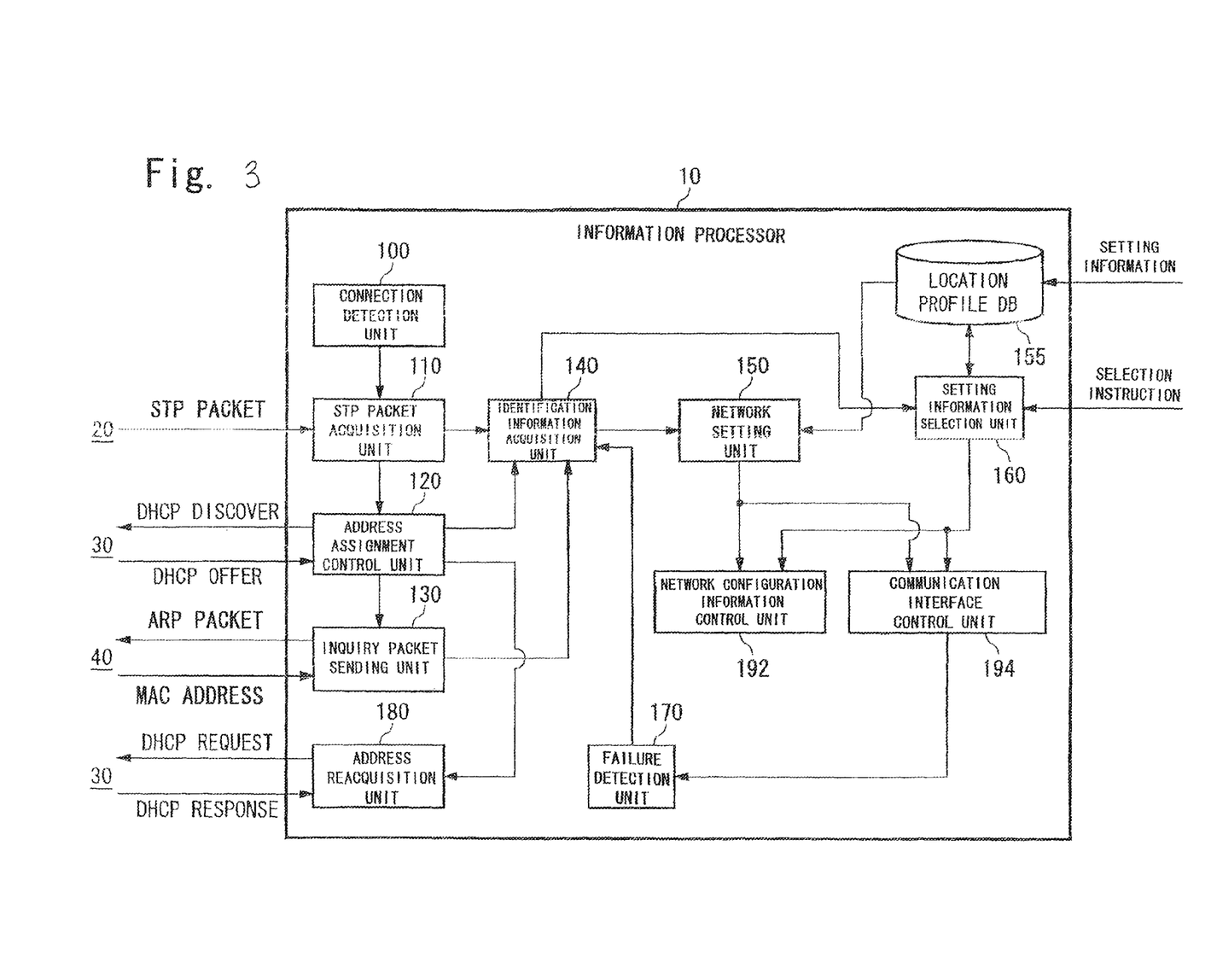
FIG. 3 is a functional block diagram of the information processor from FIG. 2.

Referring now to FIG. 3, there is illustrated a functional block diagram of information processor 10, in accordance with a preferred embodiment of the present invention. As shown, information processor 10 has a connection detection unit 100, an Spanning Tree Protocol (STP) packet acquisition unit 110 that is an example of a route setting packet acquisition unit, an address assignment control unit 120, an inquiry packet sending unit 130, an identification information acquisition unit 140, a network setting unit 150, a location profile database (DB) 155 that is an example of a setting information storage unit according to the present invention, a setting information selection unit 160, a failure detection unit 170, an address reacquisition unit 180, a network configuration information control unit 192 and a communication interface control unit 194.

Connection detection unit 100 detects that information processor 10 has been connected to a network and then sends notification of such connection to STP packet acquisition unit 110. For example, connection detection unit 100 may detect that a network cable for connecting to a network for communication has been connected to information processor 10 or detect connection by receiving notification from a network adapter.

A network is a local area network (LAN) or a subnet, for example, and it means a range in which communication is possible without relay by a router. A network may be a broadcast domain to which a broadcast packet can reach. As an example, a network may be an Ethernet or a Token Ring, or it may be a wired network or a wireless network. Multiple networks mean multiple networks wherein devices that can make communication without relay by a router are not overlapped with one another.

After a connection to a network has been detected by connection detection unit 100, STP packet acquisition unit 110 acquires an STP packet from a network device connected to the network to which information processor 10 has been connected and sends it to identification information acquisition unit 140. If STP packet acquisition unit 110 cannot acquire the STP packet, then it sends notification to that effect to address assignment control unit 120. The STP packet is an example of a route setting packet for setting a route to be used by network switch 20 to communicate with another device, which is sent by network switch 20 and is a packet, for example, for configuring a communication route without circulation in a network to which information processor 10 is connected.

The route setting packet according to the present invention is not limited to an STP packet. For example, the route setting packet may be an Open Shortest Path First (OSPF) packet for searching for the shortest route to a communication destination, an Cisco Hot Standby Router Protocol (HSRP) packet for selecting a suitable communication route from among multiplexed communication routes when a failure occurs, or a packet related to a Basic Service Set Identifier (BSSID).

If address assignment control unit 120 cannot acquire an STP packet, it sends a Dynamic Host Configuration Protocol (DHCP) DISCOVER packet, which is an example of an assignment server detection packet, to at least one network device connected to the network to which information processor 10 is connected. For example, address assignment control unit 120 may broadcast a DHCP DISCOVER packet to all network devices of a network to which information processor 10 is connected.

Then, address assignment control unit 120 acquires a DHCP OFFER packet, which is an example of an offer packet indicating that an IP address can be provided, from DHCP server 30, and sends it to identification information acquisition unit 140. Alternatively, address assignment control unit 120 may send a DHCP DISCOVER packet regardless of whether or not it can acquire an STP packet, and sends an acquired DHCP OFFER packet to identification information acquisition unit 140.

On the other hand, if address assignment control unit 120 cannot acquire a DHCP OFFER packet, it sends notification to that effect to inquiry packet sending unit 130. Address assignment control unit 120 also sends information indicating whether or not an IP address has been assigned from DHCP server 30, to address reacquisition unit 180.

If inquiry packet sending unit 130 cannot acquire a DHCP OFFER packet, then it sends an Address Resolution Protocol (ARP) packet for inquiring about the Media Access Control (MAC) address of the network device, to at least one network device connected to the network. For example, inquiry packet sending unit 130 inquires, based on the preset IP address of router 40, about a MAC address corresponding to the IP address. An ARP packet is a packet for inquiring about a MAC address corresponding to an IP address in the ARP protocol.

Next, inquiry packet sending unit 130 acquires the MAC address of router 40 as a response to the ARP packet and sends it to identification information acquisition unit 140. Alternatively, inquiry packet sending unit 130 may send an ARP packet regardless of whether or not it was able to acquire a DHCP OFFER packet.

From at least one of multiple network devices in the network to which information processor 10 is connected, identification information acquisition unit 140 acquires a MAC address which identifies the network device, via STP packet acquisition unit 110, address assignment control unit 120 and inquiry packet sending unit 130. Then, identification information acquisition unit 140 sends the acquired MAC address to network setting unit 150 and setting information selection unit 160.

For each of multiple networks, location profile DB 155 stores setting information indicating network settings to be set for information processor 10 when performing communication via the network, in association with MAC addresses identifying network devices connected to the network. Location profile DB 155 may acquire the setting information indicating network settings by causing a user to input such information. In this case, location profile DB 155 may store the acquired setting information without associating it with MAC addresses.

Network setting unit 150 acquires setting information associated with the MAC address acquired from at least one of the multiple network devices, from location profile DB 155, and sets it for network configuration information control unit 192 or communication interface control unit 194. As such, information processor 10 starts communication with another device based on the settings. If a failure is detected by failure detection unit 170, network setting unit 150 selects setting information associated with a MAC address acquired from another network device in the network to which information processor 10 is connected, from location profile DB 155 and sets the setting information.

Setting information selection unit 160 selects setting information to be set for information processor 10 from among the setting information stored in location profile DB 155, based on a selection instruction obtained from a user, and sets the setting information for network configuration information control unit 192 or communication interface control unit 194. Thus, information processor 10 can also accept manual setting by a user when connection is made to a network other than networks which it has connected before.

When detecting a communication failure in communication interface control unit 194 that performs communication based on setting information, failure detection unit 170 sends notification to that effect to identification information acquisition unit 140. If address assignment control unit 120 acquires a DHCP OFFER packet and fails to acquire an IP address from DHCP server 30, then address reacquisition unit 180 sends a DHCP REQUEST packet, which is an IP address reacquisition request, to DHCP server 30 before the operating system of information processor 10 sends an IP address reacquisition request to DHCP server 30.

As an example of the processing, address reacquisition unit 180 may send a DHCP REQUEST packet to DHCP server 30 by executing the "ipconfig/renew" command in the Microsoft Windows® operating system. Then, address reacquisition unit 180 acquires a DHCP RESPONSE packet which is notification to the effect that an IP address is to be assigned and sets the IP address indicated by the acquired DHCP RESPONSE packet for information processor 10.

Network configuration information control unit 192 controls network configuration information based on the setting information set by network setting unit 150 or setting information selection unit 160. Communication interface control unit 194 controls a communication interface based on the setting information set by network setting unit 150 or setting information selection unit 160.

Figure 4:
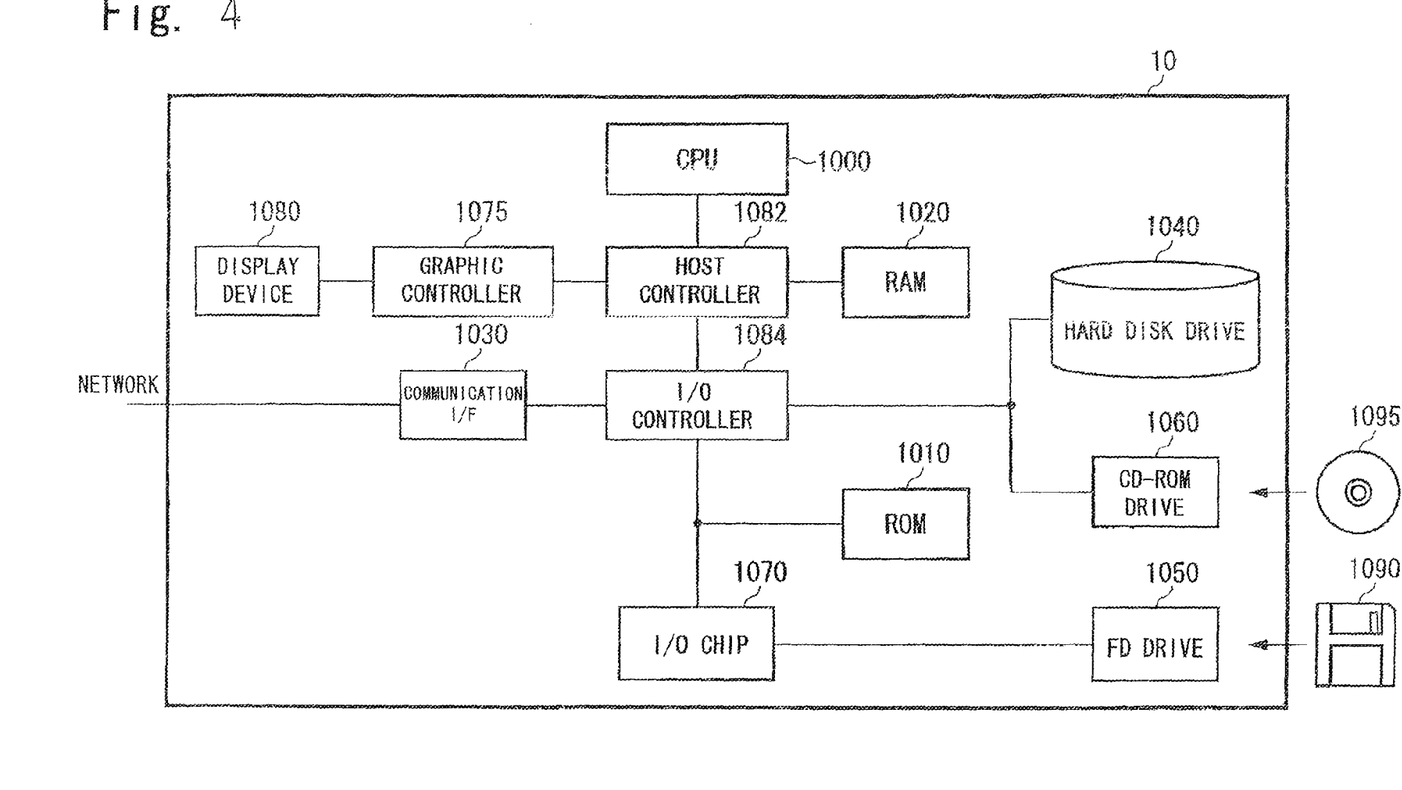
FIG. 4 is a high-level block diagram of the information processor from FIG. 2.

With reference now to FIG. 4, there is depicted a high-level block diagram of information processor 10, in accordance with a preferred embodiment of the present invention. As shown, information processor 10 includes a computer processing unit (CPU) 1000, a random access memory (RAM) 1020, a graphic controller 1075 and a display device 1080 that are mutually connected via a host controller 1082; an input/output part having a communication interface 1030, a hard disk drive 1040 and a CD-ROM drive 1060 that are connected to host controller 1082 via an input/output controller 1084; and a legacy input/output part having a ROM 1010, a flexible disk drive 1050 and an input/output chip 1070 that are connected to input/output controller 1084.

Host controller 1082 connects RAM 1020 to CPU 1000 and graphic controller 1075 that access RAM 1020 at a high transfer rate. CPU 1000 operates based on programs stored in ROM 1010 and RAM 1020 to control each part. Graphic controller 1075 acquires image data generated by CPU 1000 or the like on a frame buffer provided in the RAM 1020, and displays it on a display device 1080.

Input/output controller 1084 connects host controller 1082 to communication interface 1030, hard disk drive 1040 and the CD-ROM drive 1060 which are relatively high speed input/output devices. Communication interface 1030 communicates with an external device via a network such as an Ethernet. Hard disk drive 1040 stores programs and data to be used by information processor 10. CD-ROM drive 1060 reads a program or data from a CD-ROM 1095 and provides it to input/output chip 1070 via RAM 1020.

ROM 1010 and relatively low speed input/output devices, such as flexible disk drive 1050 and input/output chip 1070, are connected to the input/output controller 1084. ROM 1010 stores a boot program, which is executed by CPU 1000 when information processor 10 is activated, and programs dependent on the hardware of the information processor 10. Flexible disk drive 1050 reads a program or data from a flexible disk 1090 and provides it to input/output chip 1070 via RAM 1020. Input/output chip 1070 connects flexible disk 1090 or connects various input/output devices, for example, via a parallel port, a serial port, a keyboard port, a mouse port or the like.

A program to be provided for information processor 10 is stored in a recording medium such as flexible disk 1090, CD-ROM 1095 and an IC card, and provided by a user. The program is read from the recording medium via input/output chip 1070 and/or input/output controller 1084, installed in the information processor 10 and executed.

The program to be installed in information processor 10 and executed includes a connection detection module, an STP packet acquisition module, an address assignment control module, an inquiry packet sending module, an identification information acquisition module, a network setting module, a setting information selection module, a failure detection module and an address reacquisition module. The program may use hard disk drive 1040 as location profile DB 155.

Figure 5:
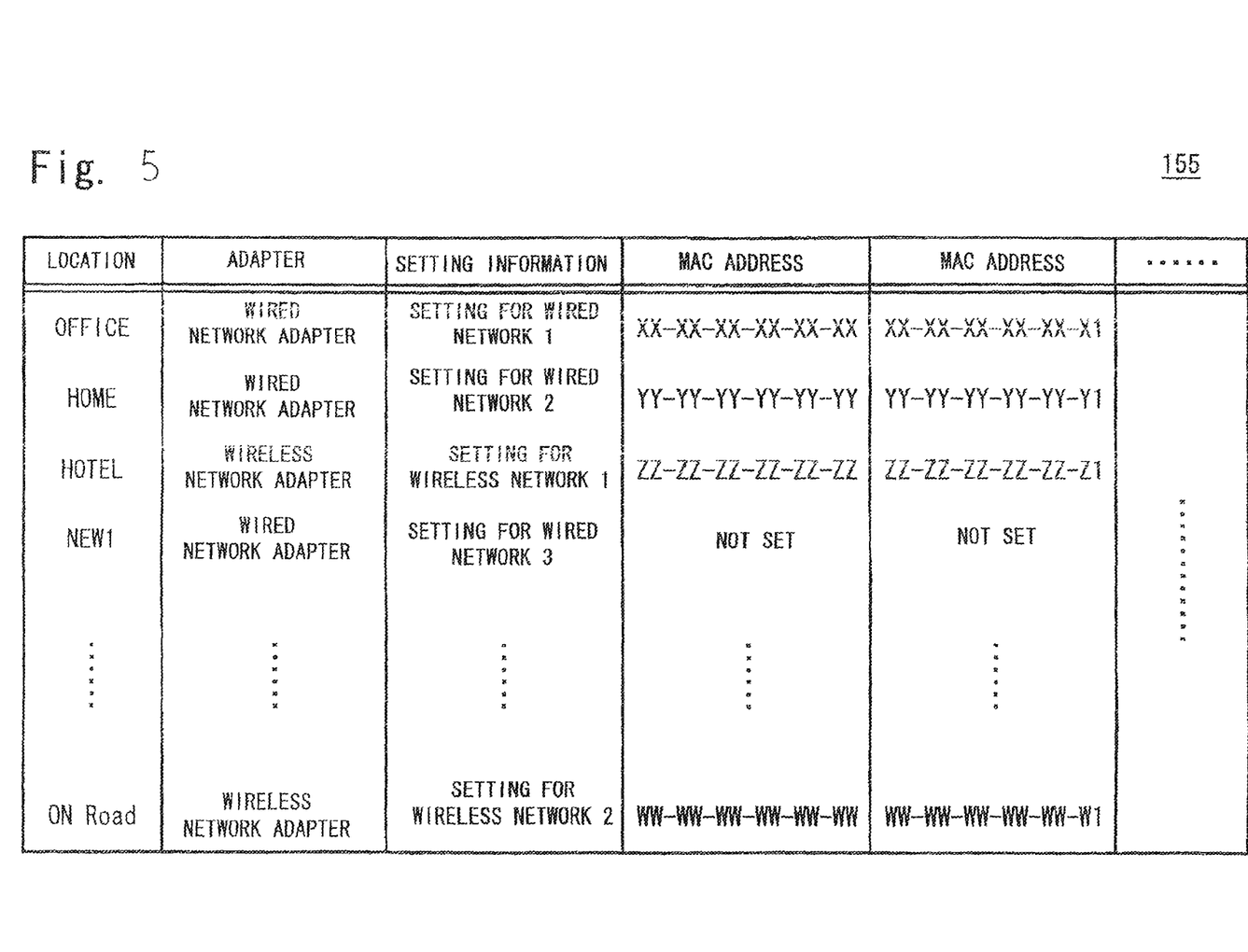
FIG. 5 is a diagram of the data structure of a location profile database.

Referring now to FIG. 5, there is depicted a data structure of location profile information stored in location profile DB 155, in accordance with a preferred embodiment of the present invention. For each of the multiple networks, location profile DB 155 stores setting information indicating network settings to be set for information processor 10 when performing communication via the network, in association with MAC addresses identifying network devices connected to the network.

The setting information is, for example, parameters to be set for network configuration information control unit 192 to control the operation of an application program or parameters to be set for communication interface control unit 194 to control the operation of the network interface. Specifically, the setting information is information whether or not a DHCP function is used, the name of a DNS server, the SSID and the encryption method to be used in the case of connecting to a wireless network, the name of a proxy server used by browser software, information for controlling a firewall function, information about whether a printer and files are to be shared with other devices, settings for a printer, programs to be activated when connection is made to a network, settings for a VPN program or the like.

A MAC address is specified for each network device connected to a computer network and is a value of six bytes specific to the network device. The device identification information according to the present invention is not limited to the MAC address, and any identification information specific to a network device may be used. For example, identification information specific to a wireless access point, such as a Basic Service Set Identifier (BSSID) and an Extended Service Set Identifier (ESSID) may be used.

Within location profile DB 155, there are stored, in association with location information for identifying a network, a network adapter to be used in the case of connecting to the network, setting information to be set in the case of connecting to the network and the MAC address of each of network devices connected to the network.

As an example, setting information for the location information "OFFICE" is wired network settings 1. The MAC address of one network device in the network corresponding to the location information "OFFICE", XX-XX-XX-XX-XX-XX, and the MAC address of another network device, XX-XX-XX-XX-XX-X1, are associated with the wired network settings 1.

In the current example, if an acquired MAC address is any of XX-XX-XX-XX-XX-XX and XX-XX-XX-XX-XX-X1, then network setting unit 150 sets the wired network settings 1 associated with the location information "OFFICE" for network configuration information control unit 192 or communication interface control unit 194. As such, it is possible to select appropriate setting information without performing processing such as displaying a list of location profile information for a user to cause the user to select any location profile information therefrom.

When newly accepting input of setting information from a user, location profile DB 155 may store the setting information without associating it with MAC addresses, as shown in the location information "NEW1." In this case, location profile DB 155 stores the setting information in association with a MAC address to be acquired by identification information acquisition unit 140 when connection is made to the network subsequently.

Figure 6:
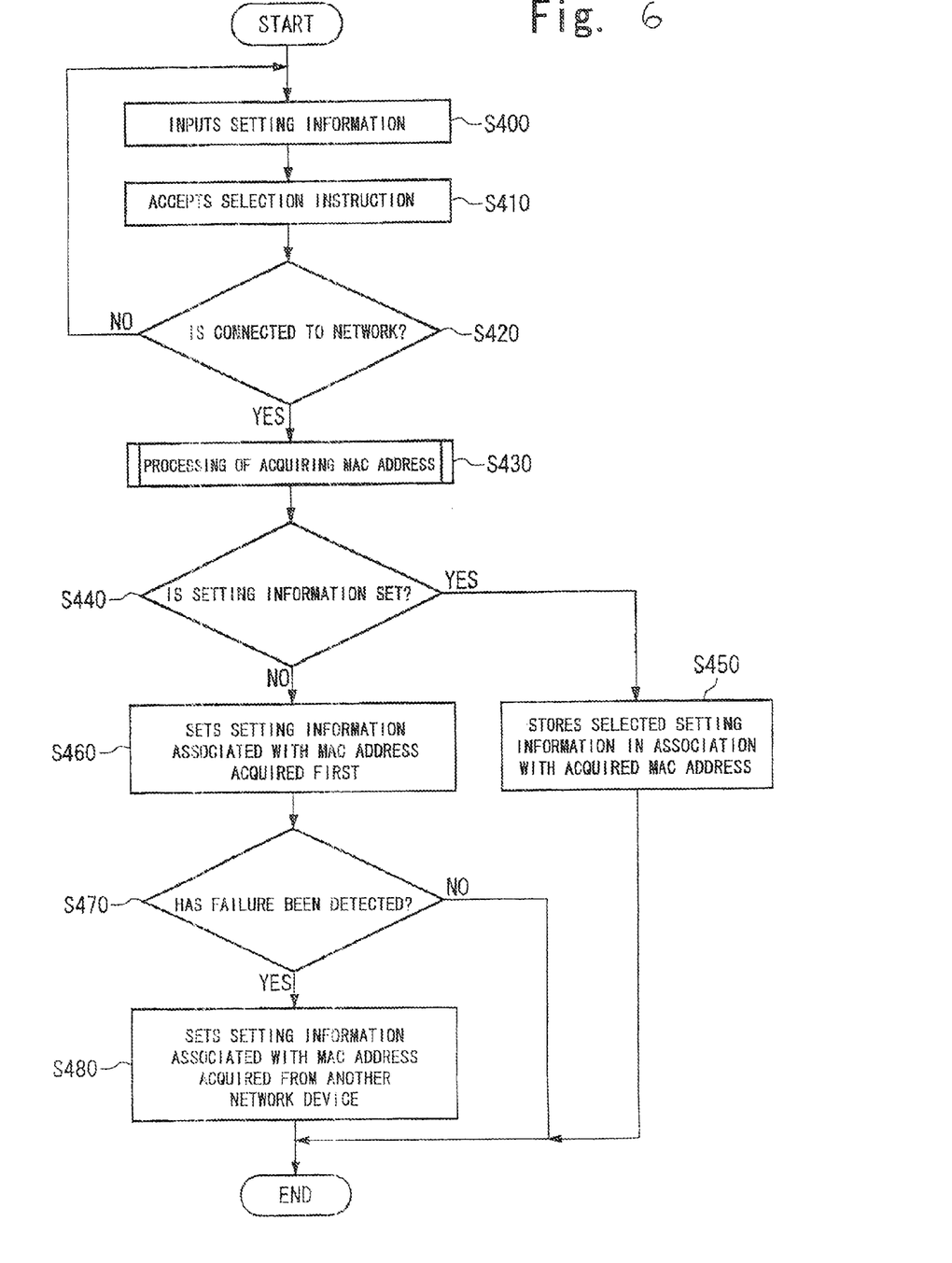
FIG. 6 is a high-level logic flow diagram of a method for setting information by the information processor from FIG. 2.

With reference now to FIG. 6, there is depicted a high-level logic flow diagram of a method for setting information by information processor 10, in accordance with a preferred embodiment of the present invention. Initially, location profile DB 155 causes a user to input setting information (S400). When accepting a selection instruction from the user, setting information selection unit 160 selects setting information to be set for information processor 10 from among setting information stored in the location profile DB 155 based on the selection instruction and sets the setting information for the network configuration information control unit 192 or communication interface control unit 194 (S410). If connection detection unit 100 does not detect that a connection has been made to a network (S420: NO), then information processor 10 returns to process S400.

If connection detection unit 100 detects that a connection has been made to a network (S420: YES), then identification information acquisition unit 140 acquires a MAC address from at least one of multiple network devices (such as network switch 20, DHCP server 30 and router 40 from FIG. 2) in the network to which information processor 10 is connected (S430). Alternatively, when information processor 10 returns from a power-saving operation mode to a normal operation mode or when power is on for information processor 10, identification information acquisition unit 140 may acquire MAC addresses from the multiple network devices in the network to which information processor 10 is connected.

If setting information has been set by setting information selection unit 160 at S410 (S440: YES), location profile DB 155 stores the setting information selected by setting information selection unit 160 in association with a MAC address acquired by identification information acquisition unit 140 (S450). For example, if the setting information selected by setting information selection unit 160 is not associated with any MAC address, then location profile DB 155 associates the MAC address with the setting information and stores it.

If location profile DB 155 has already stored the setting information selected by setting information selection unit 160 in association with a MAC address, then it further associates the setting information with the MAC address acquired by identification information acquisition unit 140 and stores it. Alternatively, location profile DB 155 may store the setting information in association with the MAC address acquired by identification information acquisition unit 140 instead of the MAC address already stored in association with the setting information.

On the other hand, if setting information has not been set by setting information selection unit 160 at S410 (S440: NO), then network setting unit 150 sets the setting information associated with the MAC address acquired by identification information acquisition unit 140 for network configuration information control unit 192 or communication interface control unit 194 (S460).

If failure detection unit 170 detects a failure in communication using the setting information set by network setting unit 150 or setting information selection unit 160 (S470: YES), then network setting unit 150 may set setting information associated with a MAC address acquired from another network device in the connected network for network configuration information control unit 192 or communication interface control unit 194 (S480). In other words, if communication cannot be appropriately performed with the use of setting information associated with a MAC address acquired earliest, communication with the use of setting information associated with a MAC address acquired next is attempted. As such, even when any change is made in the configuration of a network, such as when a MAC address acquired earliest and a MAC address acquired next are associated with different setting information, the possibility of performing appropriate communication can be enhanced.

The processing order in the procedure shown in the figure is only an example, and information processor 10 may set setting information in a different order. For example, location profile DB 155 may cause a user to input setting information after information processor 10 is connected to a network. Then, setting information selection unit 160 may acquire a selection instruction from the user after the information processor 10 is connected to the network. In such a case, identification information acquisition unit 140 may acquire a MAC address irrespective of whether or not connection detection unit 100 has detected the connection to the network. Location profile DB 155 may store the inputted setting information in association with the acquired MAC address.

Figure 7:
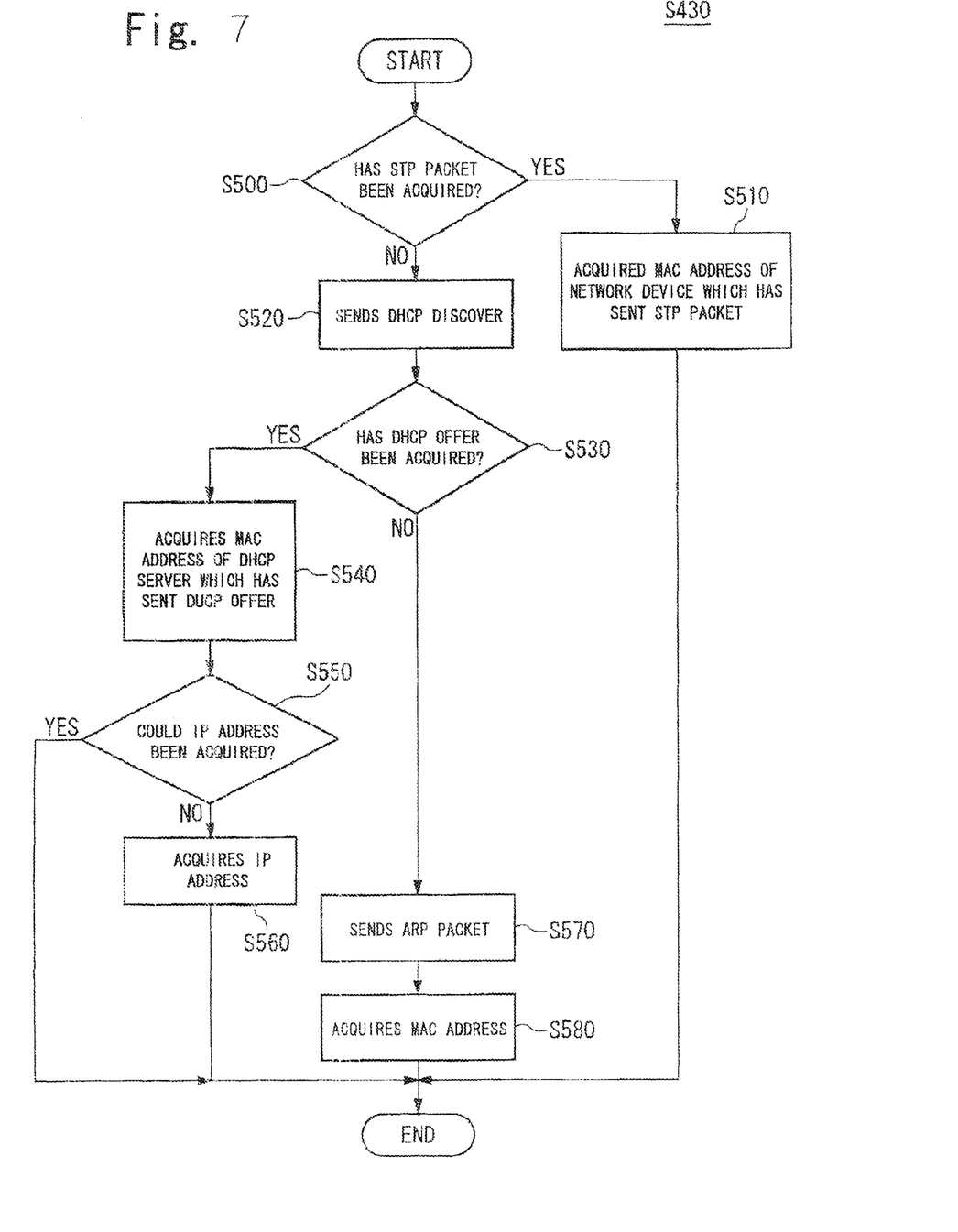
FIG. 7 is a high-level logic flow diagram of a method for acquiring device identification information by the information processor from FIG. 2.

Referring now to FIG. 7, there is illustrated a high-level logic flow diagram of a method for acquiring device identification information at S430 of FIG. 4, in accordance with a preferred embodiment of the present invention. If Spanning Tree Protocol (STP) packet acquisition unit 110 acquires an STP packet from network switch 20 (S500: YES), identification information acquisition unit 140 acquires a MAC address identifying the network device which has sent the STP packet from the STP packet (S510).

An STP packet is a Bridge Protocol Data Unit (BPDU) packet periodically sent by network switch 20, which is a layer 2 switch, in order to prevent communication impossibility from being caused by circulation of communication among layer 2 switches. For example, network switch 20 sends an STP packet including its MAC address to the devices within the network at a predetermined time interval, for example, every two seconds. By referring to the STP packet, the other devices within the network can detect that network switch 20 is connected to the network and detect whether network switch 20 is connected to a communication route reachable from any port of the other devices. As such, it is possible for a layer 2 switch such as the network switch 20 to appropriately detect the network structure and select a route without circulation to be used for communication. Furthermore, even when a new device is connected to the network or when a device is removed, it is possible to select a new communication route within a predetermined time, for example, within two seconds.

On the other hand, if STP packet acquisition unit 110 fails in acquisition of an STP packet (S500: NO), then address assignment control unit 120 sends a DHCP DISCOVER packet for detecting DHCP server 30 to all the network devices within the network to which information processor 10 is connected (S520).

For example, if STP packet acquisition unit 110 cannot receive an STP packet within a predetermined period of time, for example, within two seconds, it determines that acquisition of an STP packet has failed. That is, if a failure is temporarily caused in communication between network switch 20 and information processor 10, or if network switch 20 is not connected to the network, then information processor 10 terminates the processing of acquiring a MAC address from an STP packet and quickly proceeds to the next means.

If address assignment control unit 120 can acquire a DHCP OFFER packet, which is a response to a DHCP DISCOVER packet, from the DHCP server 30 within a predetermined period of time after sending the DHCP DISCOVER packet (S530: YES), then identification information acquisition unit 140 acquires the MAC address of DHCP server 30 that has sent the DHCP OFFER packet from the DHCP OFFER packet acquired by address assignment control unit 120 (S540).

If address reacquisition unit 180 fails in acquisition of an IP address from DHCP server 30 (S550: NO), then it acquires an IP address by sending a DHCP REQUEST packet to DHCP server 30 before the operating system of information processor 10 sends an IP address reacquisition request to DHCP server 30 (S560).

For example, if an IP address has not been acquired from DHCP server 30, an operating system, such as Windows® operating system, performs IP address reacquisition processing at a predetermined time interval irrespective of whether or not a DHCP OFFER packet has been normally acquired. Therefore, once acquisition of an IP address fails when a connection is made to a network, a user has to wait for the predetermined time interval before communication starts, which may be inconvenient for the user.

However, if a DHCP OFFER packet can be acquired, it is possible to normally communicate with DHCP server 30 and to normally acquire an IP address by sending a DHCP REQUEST packet immediately in many cases. That is, address reacquisition unit 180 can acquire an IP address more quickly by sending a DHCP REQUEST packet to DHCP server 30 before the operating system sends an IP address reacquisition request to DHCP server 30.

On the other hand, if address assignment control unit 120 cannot acquire a DHCP OFFER packet (S530: NO), then inquiry packet sending unit 130 sends an ARP packet for inquiring about a MAC address corresponding to the IP address of router 40, to router 40 (5570). For example, when connecting to a network to which network switch 20 is not connected, information processor 10 starts communication with the use of an IP address preset for information processor 10 and an IF address preset as a default gateway. In this case, inquiry packet sending unit 130 may inquire about a MAC address corresponding to the IP address preset as a default gateway with the use of an ARP packet.

Then, identification information acquisition unit 140 acquires the MAC address of router 40 as a response to the ARP packet (S580). Since router 40 is connected to the network in many cases, information processor 10 can acquire a MAC address more certainly even it network switch 20 or DHCP server 30 is not connected to the network.

Instead of the processing described above, information processor 10 may detect network devices connected to the network by sequentially inquiring, for each of the multiple MAC addresses stored in location profile DB 155, about an IP address corresponding to the MAC address by means of a Reverse ARP (RARP) command. In this case, it is possible to detect the network devices more certainly though a certain degree of time is required for the detection thereof.

Identification information acquisition unit 140 may acquire a MAC address from each of the multiple network devices in parallel. That is, identification information acquisition unit 140 may perform acquisition of an STP packet, sending of a DHCP DISCOVER packet and sending of an ARP packet in parallel. In this case, network setting unit 150 may set setting information associated with a MAC address acquired earliest after connection to the network is detected by connection detection unit 100. As such, it is possible to enhance the possibility of acquiring a MAC address more quickly though the processing of sending information to the outside is inevitably required.

Information processor 10 sequentially processes means so that such means as is capable of acquiring a MAC address more quickly and sending less amount of information is processed prior to the other means. For example, acquisition of an STP packet, sending of a DHCP DISCOVER packet and sending of an ARP packet are performed in that order. As such, if an STP packet can be acquired, a MAC address can be acquired quickly without necessity of sending information to the network at all. Even if an STP packet cannot be acquired, a MAC address can be certainly acquired.

If a MAC address can be acquired by acquisition of an STP packet or sending of a DHCP DISCOVER packet, information processor 10 can complete network setting prior to acquisition of an IP address. Unlike the case of making settings for network security after acquisition of an IP address, it is possible to prevent communication from being started without completion of security settings, and communication is less subject to attacks from the outside.

As has been described, the present invention provides an improved method and apparatus for connecting an information processor to any network to perform communications.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   determining by an information processor whether or not a spanning tree protocol (STP) packet has been received from a network switch;
   in a determination that said STP packet has been received from said network switch, acquiring a MAC address of said network device that sent said STP packet;
   in a determination that said STP packet has not been received from said network switch, sending by said information processor a DHCP discover packet for detecting a DHCP server to which all network devices are connected;
   determining whether or not a DHCP offer packet has been received from said DHCP server in response to said DHCP discover packet within a predetermined period of time after said DHCP packet was sent;
   in a determination that said DHCP offer packet has been received, acquiring by said information processor a MAC address of a DHCP server that sent said DHCP offer packet; and
   in a determination that said DHCP offer packet has not been received, sending by said information processor an ARP packet and acquiring by said information processor a MAC address of a router as a response to said ARP packet.

2. The method of claim 1 further comprising: acquiring an IP address by sending a DHCP request packet to said DHCP server if said information processor cannot acquire said IP address from said DHCP server.

\* \* \* \* \*